United States Patent
Hammer et al.

(10) Patent No.: US 10,252,469 B2
(45) Date of Patent: Apr. 9, 2019

(54) METHOD FOR PRODUCING A COMPONENT CONNECTION

(71) Applicant: Bayerische Motoren Werke Aktiengesellschaft, Munich (DE)

(72) Inventors: Maik Hammer, Bruckberg (DE); Johann Van Niekerk, Munich (DE); Clemens Stefanziosa, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 139 days.

(21) Appl. No.: 15/401,313

(22) Filed: Jan. 9, 2017

(65) Prior Publication Data

US 2017/0113400 A1    Apr. 27, 2017

Related U.S. Application Data

(63) Continuation of application No. PCT/EP2015/066759, filed on Jul. 22, 2015.

(30) Foreign Application Priority Data

Aug. 13, 2014 (DE) .................. 10 2014 216 006

(51) Int. Cl.
*B32B 37/00* (2006.01)
*B29C 65/08* (2006.01)
(Continued)

(52) U.S. Cl.
CPC .......... *B29C 65/08* (2013.01); *B29C 65/7811* (2013.01); *B29C 65/7841* (2013.01);
(Continued)

(58) Field of Classification Search
CPC . B29C 65/08; B29C 65/7811; B29C 65/7847; B29C 66/1182; B29C 66/21;
(Continued)

(56) References Cited

U.S. PATENT DOCUMENTS 3,347,730 A    10/1967 Keller et al.
4,865,680 A     9/1989 Pierson
(Continued)

FOREIGN PATENT DOCUMENTS

CN    103534059 A    1/2014
DE    201 05 550 U1  8/2001
(Continued)

OTHER PUBLICATIONS

International Search Report (PCT/ISA/210) issued in PCT Application No. PCT/EP2015/066759 dated Oct. 14, 2015 with English translation (six pages).
(Continued)

*Primary Examiner* — James D Sells
(74) *Attorney, Agent, or Firm* — Crowell & Moring LLP

(57) ABSTRACT

A method is provided for producing a component connection. The method includes the following steps: providing a first component, providing a first ball, pressing the first ball against the first component by a sonotrode, vibrating the first ball by the sonotrode such that material of the first ball and/or material of the first component melts, and the first ball is welded to the first component, providing a second ball, pressing the second ball against the first ball by the same sonotrode or another sonotrode, and vibrating the second ball by the same sonotrode or the other sonotrode such that material of the second ball and/or material of the first ball melts, and the second ball is welded to the first ball.

17 Claims, 2 Drawing Sheets

(51) Int. Cl.
- *B29C 65/78* (2006.01)
- *B29C 65/00* (2006.01)
- *B29L 31/00* (2006.01)
- *B29C 65/56* (2006.01)
- *B29C 65/58* (2006.01)
- *B29C 65/72* (2006.01)
- *B29L 31/30* (2006.01)
- *B29K 101/12* (2006.01)

(52) U.S. Cl.
CPC ...... *B29C 65/7847* (2013.01); *B29C 66/1182* (2013.01); *B29C 66/21* (2013.01); *B29C 66/474* (2013.01); *B29C 66/721* (2013.01); *B29C 66/73921* (2013.01); *B29C 66/81431* (2013.01); *B29C 66/8322* (2013.01); *B29C 65/082* (2013.01); *B29C 65/562* (2013.01); *B29C 65/58* (2013.01); *B29C 65/72* (2013.01); *B29C 66/1122* (2013.01); *B29C 66/41* (2013.01); *B29C 66/7212* (2013.01); *B29C 66/72141* (2013.01); *B29C 66/72143* (2013.01); *B29C 66/72321* (2013.01); *B29C 66/72326* (2013.01); *B29C 66/81423* (2013.01); *B29C 66/81463* (2013.01); *B29C 66/8242* (2013.01); *B29C 66/861* (2013.01); *B29C 66/863* (2013.01); *B29K 2101/12* (2013.01); *B29L 2031/30* (2013.01); *B29L 2031/737* (2013.01)

(58) Field of Classification Search
CPC ................ B29C 66/474; B29C 66/721; B29C 66/73921; B29C 66/81431; B29C 66/8322

USPC ........................................................ 156/73.1
See application file for complete search history.

(56) References Cited

U.S. PATENT DOCUMENTS

| | | |
|---|---|---|
| 4,865,687 A | 9/1989 | Pierson |
| 2003/0062110 A1* | 4/2003 | Urlaub .................... B06B 3/02 |
| | | 156/73.1 |
| 2010/0078115 A1 | 4/2010 | Lang |
| 2011/0173797 A1 | 7/2011 | Van Niekerk et al. |
| 2014/0143989 A1 | 5/2014 | Herzinger et al. |

FOREIGN PATENT DOCUMENTS

| | | |
|---|---|---|
| DE | 10 2009 049 602 B3 | 7/2011 |
| DE | 10 2012 214 453 B3 | 6/2014 |
| EP | 1 930 148 A1 | 6/2008 |
| EP | 2 698 549 A1 | 2/2014 |
| WO | WO 90/07421 A2 | 7/1990 |

OTHER PUBLICATIONS

German-language Written Opinion (PCT/ISA/237) issued in PCT Application No. PCT/EP2015/066759 dated Oct. 14, 2015 (five pages).

German Office Action issued in counterpart German Application No. 10 2014 216 006.5 dated Apr. 16, 2015 (six pages).

Chinese-language Office Action issued in counterpart Chinese Application No. 201580028402.5 dated May 3, 2018 with English translation (fifteen (15) pages).

\* cited by examiner

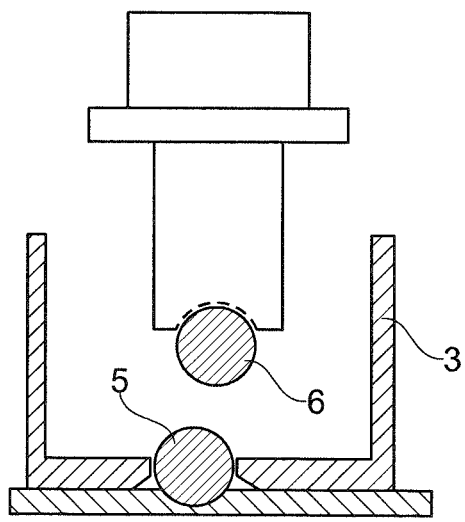
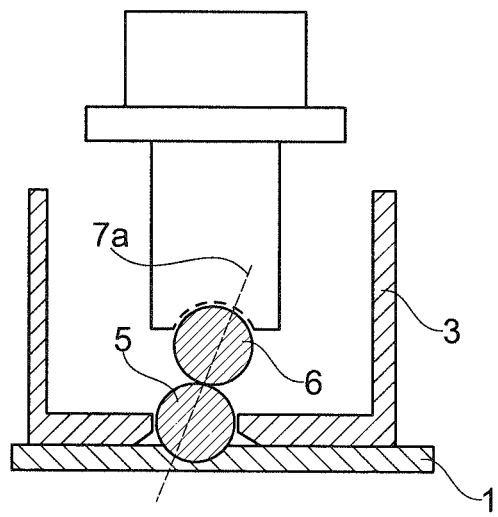
Fig. 5    Fig. 6
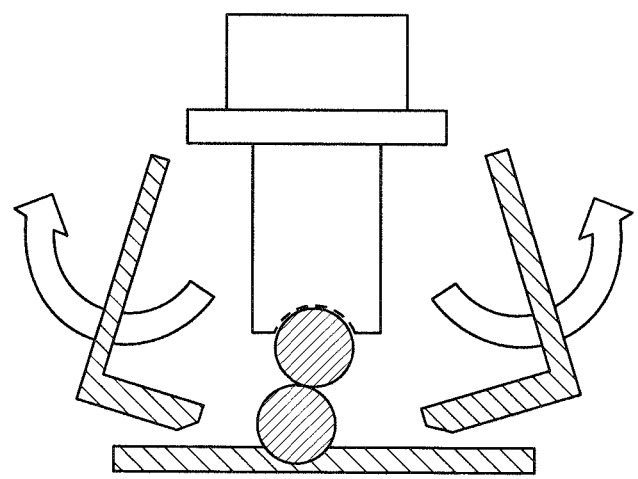
Fig. 7

METHOD FOR PRODUCING A COMPONENT CONNECTION

CROSS REFERENCE TO RELATED APPLICATIONS

This application is a continuation of PCT International Application No. PCT/EP2015/066759, filed Jul. 22, 2015, which claims priority under 35 U.S.C. § 119 from German Patent Application No. 10 2014 216 006.5, filed Aug. 13, 2014, the entire disclosures of which are herein expressly incorporated by reference.

This application contains subject matter related to U.S. application Ser. No. 15/379,517, entitled "Method for Producing a Component Connection" filed Dec. 15, 2016.

BACKGROUND AND SUMMARY OF THE INVENTION

The present invention relates to a method for producing a component connection of first and second components via a ball as a connecting part.

From the prior art, a large number of component connections are known in which balls are used as connection elements. For example, DE 10 2009 049 602 B3 discloses a "component connection" in which there is welded to a bodywork sheet a ball which acts as a connection element and which engages in a positive-locking manner in a recess which is provided in another sheet.

DE 10 2012 214 453 discloses a component connection in which a "dual ball", that is to say, a connection element which is formed by two balls which are connected to each other, is welded to a sheet, wherein a clip element can be clip-fitted to the dual ball.

An object of the invention is to provide a method for producing a component connection which has a dual ball or a multiple ball, which method opens up other application fields.

This and other objects are achieved according to the invention by a method for producing a component connection that includes the follow steps: providing a first component; providing a first ball; pressing the first ball against the first component by use of a sonotrode; causing the first ball to vibrate by use of the sonotrode in such a manner that material of the first ball and/or material of the first component melts and welds the first ball to the first component; providing a second ball; pressing the second ball against the first ball by use of the same or another sonotrode; causing the second ball to vibrate by use of the same or another sonotrode in such a manner that material of the second ball and/or material of the first ball melts and the second ball is welded to the first ball.

The starting point of the method according to the invention for producing a component connection is a substrate which is referred to below as the "first component". The first component may, for example, be planar or have almost any other form.

The first component is at least in the region of a portion of the surface thereof produced from thermoplastic plastics material. Of course, the entire first component may be produced completely from thermoplastic plastics material. Alternatively, the first component may be produced completely or partially from a fiber-reinforced thermoplastic plastics material. The fibers are then distributed inside the thermoplastic plastics material of the first component and are used for reinforcing or strengthening. It is possible to consider as strengthening fibers, for example, carbon fibers, glass fibers, aramid fibers or the like. With regard to the fiber length thereof, long fibers, short fibers or so-called endless fibers or combinations thereof can be used.

As already indicated, the entire first component does not have to completely be made of thermoplastic plastics material. It is also contemplated for the first component to have a carrier substrate which is coated completely or at least in a part-region of the surface thereof with a thermoplastic plastics material or a fiber-reinforced thermoplastic plastics material.

According to the invention, a first ball is connected to the first component by use of ultrasonic welding. To this end, a first ball which is provided is pressed by a sonotrode against a "connection location" of the first component.

The first ball may be a ball which completely comprises thermoplastic plastics material. Alternatively, it may also be a hollow ball which comprises a thermoplastic plastics material. It is further contemplated for the first ball to have a ball core which, for example, may comprise steel, aluminum, glass, lead or the like and which is coated or covered completely or partially with a thermoplastic plastics material or a fiber-reinforced thermoplastic plastics material. In this manner, specific properties of the ball core which may, for example, be magnetic, can be combined with the specific properties of the thermoplastic plastics material which is used as a "coating" (for example, weldability to components or substrates).

If at least the surface or a portion of the surface of the first ball comprises a fiber-reinforced or particle-reinforced plastics material, the strength of the first ball can thereby be increased.

Using the sonotrode, the first ball which is pressed onto the first component is caused to vibrate which leads to material of the first ball and/or material of the first component melting locally, that is to say, all the way around the contact location. Thus, the first ball locally welds to the first component.

According to the invention, a second ball is welded onto the first ball. To this end, the second ball is first pressed by way of the same sonotrode or another sonotrode against the first ball and caused to vibrate which leads to material of the second ball and/or the material of the first ball melting in the contact region, that is to say, all the way around the contact location. Thus the second ball welds to the first ball.

According to the invention, it is of course possible to produce not only dual balls but also quite generally multiple balls, that is to say, connection elements which have two or more than two balls which are welded to each other sequentially one after the other.

The individual balls which are intended to be welded to each other may be identical or different with respect to their structure. For example, the second ball may be a solid ball which is produced from thermoplastic plastics material or a hollow ball which is produced from thermoplastic plastics material. Alternatively, the second ball may have a ball core which is made of, for example, steel, aluminum, glass, lead or the like and which is completely or partially coated or covered with a thermoplastic plastics material or a fiber-reinforced thermoplastic plastics material. As already explained above in connection with the first ball, specific properties of the ball core can thereby be combined with specific properties of the coating.

In order to facilitate the pressing and positioning of the second ball on the first ball or with respect to the first ball, a positioning aid can be used. The term "positioning aid" is intended quite generally to be understood to mean a device which partially or completely engages round the first ball and which acts as a guide for precise guiding of the sonotrode or the second ball which is intended to be pressed thereby onto the first ball. In other words, the positioning aid is thus initially placed on the first ball, wherein the positioning aid at least partially engages round the first ball. Subsequently, the sonotrode is guided or positioned by the positioning aid when the second ball is pressed onto the first ball.

The same or a similar positioning aid can also already be used when the first ball is pressed onto or welded to the first component. Before the first ball is pressed onto the first component, therefore, a positioning aid is first placed or pressed on the first component. When the positioning aid is located in a defined position, with assistance the sonotrode or the first ball is guided toward the first component by way of the sonotrode and is pressed against the first component.

In order to achieve precise positioning of the first ball with respect to the first component, a physical marking may be provided on or in the surface of the first component. The physical marking may, for example, be constructed as an indentation-like recess, as a through-hole or the like. The first ball protrudes at least a little way into the physical marking and is thereby clearly positioned relative to the first component.

According to a development of the invention, there is provision for the first or the second ball during the welding operation to be caused to vibrate in a translational manner by way of the sonotrode. Alternatively or additionally, there may also be provision for the first or second ball to be caused to vibrate in a torsional manner by way of the sonotrode during the welding operation.

A significant advantage which is afforded by the completely symmetrical structure of a ball is that, when a ball is welded, it is always correctly orientated in space. Therefore, the ball which is intended to be welded only has to be correctly positioned but not orientated in a specific manner. As a result of the convex geometry of a ball, during positioning on the first component or when the second ball is placed on the first ball, there is produced a point-like contact or a substantially point-like contact. This leads to very high energy densities during the welding operation and consequently to a cleaner locally limited melting of the ball material or the material of the first component. As a result, there is consequently produced a qualitatively very high-grade weld connection.

According to a development of the invention, the first or second ball is sucked or drawn onto or into an indentation-like recess of the sonotrode by use of a suction device. In the sucked-in or drawn-in state, the ball is pressed by way of the sonotrode onto the first component or onto the first ball.

The indentation-like recess may in particular be constructed in the form of a ball joint (socket). The radius of curvature of the ball-joint-like recess of the sonotrode may be equal to the radius of the ball. Relative thereto, the radius of curvature of the ball-joint-like recess may be slightly smaller than the radius of the ball, which then leads to annular contact between the ball-like recess and the ball. If the radius of curvature of the ball-joint-like recess is slightly larger than the radius of the ball, the ball is in abutment with the ball-joint-like recess only in the region of a relatively small contact face.

There may be provision for the first or second ball to be removed by way of suction using the suction device from a ball reservoir, in particular from a storage container which is filled with a large number of balls, sucked onto the sonotrode and by way of the sonotrode guided toward and pressed onto the first component or the first ball.

Alternatively, there may also be provision for the ball to be supplied to the sonotrode or the recess of the sonotrode by way of a supply device (for example, pneumatically by means of a supply hose or the like), for example, from the side.

According to a development of the invention, a clip element is clip-fitted to the first and/or the second ball. The clip element may be an integral part of a second component.

For such a component connection, there are almost unlimited application possibilities. The invention is particularly suitable for vehicle bodywork construction, that is to say, the first and/or the second component may, for example, be a vehicle bodywork component. Alternatively, the first or the second component may be a vehicle bodywork component and the other component may be a fitted component. Such fitted components may, for example, occur in very large numbers in the engine compartment region of vehicles, but also in other regions of the vehicle, such as, for example, in the trunk space, in the underfloor region or the like.

Using such a clip element, a second component which has holes may also be connected to the first component in a positive-locking and/or non-positive-locking manner. The second component which is provided with a through-hole can thus be positioned on the first component in such a manner that the "dual ball" which is formed by the two balls protrudes through the hole which is provided in the second component. In order to fix the two components, only one clip element then has to be clip-fitted to the "dual ball" which then acts as a connection element for the two components.

The welding of the balls can be carried out manually, that is to say, by way of a sonotrode which is intended to be guided and actuated by hand, or in a fully automated manner. With an automated process, the sonotrode is guided, for example, by use of an industrial robot.

Other objects, advantages and novel features of the present invention will become apparent from the following detailed description of one or more preferred embodiments when considered in conjunction with the accompanying drawings.

BRIEF DESCRIPTION OF THE DRAWINGS

FIG. 5 is an illustration of another step in the exemplary method for producing the component connection FIG. 6 is an illustration of another step in the exemplary method for producing the component connection FIG. 7 is an illustration of another step in the exemplary method for producing the component connection

DETAILED DESCRIPTION OF THE DRAWINGS

Figure 1:
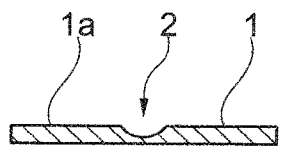
FIG. 1 is a cross-sectional view of a first, substantially planar, material component in an upper side of which there is provided an indentation.

FIG. 1 shows a first, substantially planar plastics material component 1 in the upper side 1a of which there is provided an indentation-like recess which acts as a "physical" marking for positioning a ball. The first component 1 may be made completely of a thermoplastic plastics material or be covered with a thermoplastic plastics material.

Figure 2:
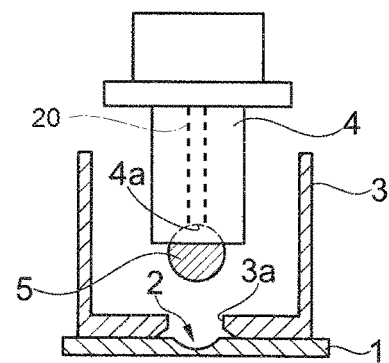
FIG. 2 is an illustration of a step in an exemplary method for producing a component connection.

In the method step shown in FIG. 2, a positioning aid 3 is placed on the first component 1. The positioning aid 3 has a circular recess 3a which is orientated concentrically relative to the indentation-like recess 2.

By use of a sonotrode 4 which is illustrated in this instance only very schematically and which has at the lower end face thereof an indentation-shaped recess 4a, a first ball 5 is drawn in. The suction of the ball 5 on or into the indentation-shaped recess 4a of the sonotrode 4 is carried out by way of a suction device 20 (shown only very schematically). The suction device is integrated in the sonotrode 4 or is arranged on the sonotrode 4.

Figure 3:
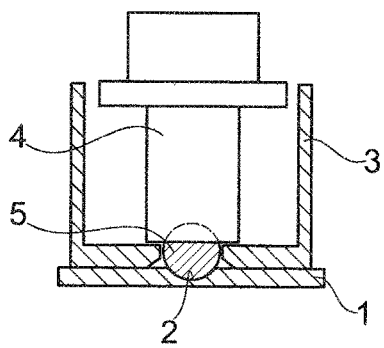
FIG. 3 is an illustration of another step in the exemplary method for producing the component connection

The first ball 5 which is drawn onto the sonotrode 4 is moved toward the first component 1 by way of translational displacement of the sonotrode 4 until the first ball 5 comes to rest precisely in the indentation-like recess 2 of the first component 1, which is illustrated in FIG. 3. The positioning aid 3 serves to guide the sonotrode in this case, whereby it is ensured that the first ball 5 is positioned precisely centrally with respect to the indentation-shaped recess 2.

Subsequently, the sonotrode 4 is "switched on". The sonotrode 4 in this instance applies "ultrasound vibrations" to the first ball 5. The ultrasound vibrations may be translational vibrations and/or torsional vibrations. As a result of the ultrasound vibrations, there is produced in the contact region between the first ball 5 and the first component 1 or the indentation-like recess 2 such a high energy density that material of the first ball 5 and/or material of the first component 1 locally melts, which leads to local melting or welding of the first ball 5 to the first component 1.

As can be seen in FIG. 3, the outer diameter of the first ball 5 substantially corresponds to the diameter 3a of the positioning aid 3, whereby it is ensured that the first ball 5, even when the sonotrode 4 is switched on, remains precisely in the position thereof predetermined by the recess 3a.

Figure 4:
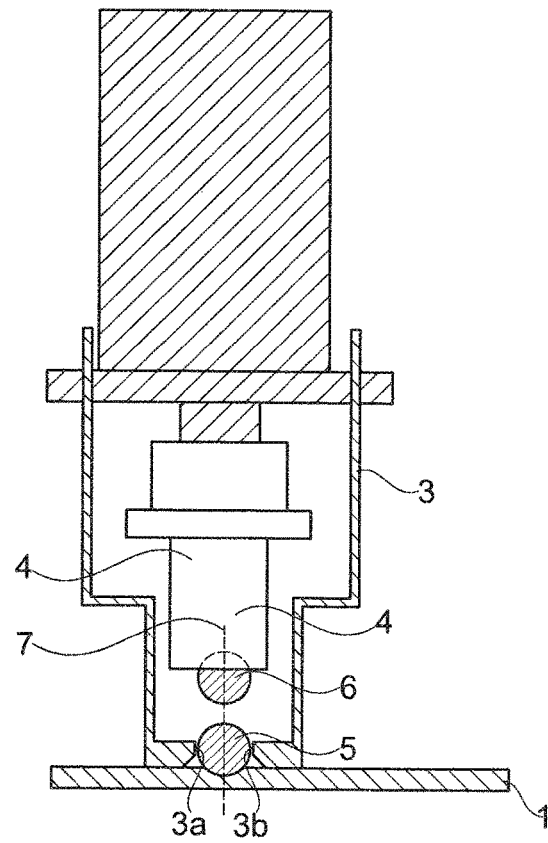
FIG. 4 is an illustration of another step in the exemplary method for producing the component connection

FIG. 4 shows the method step of welding a second ball 6 to the first ball 5. Firstly, a positioning aid or the same positioning aid 3 is also placed on the first component 1 in this instance. The positioning aid 3 has at the lower side of the circular recess 3a thereof a chamfered portion 3b which facilitates a "positioning" of the positioning aid 3 on the first ball 5. As a result of the chamfered portion 3b, the positioning aid can slide downward on the first ball. Since the diameter of the recess 3a corresponds to the diameter of the first ball 5, the positioning aid is, as already mentioned, is positioned precisely with respect to the first ball 5.

Subsequently, the second ball 6 is drawn onto the sonotrode 4. The sonotrode 4 is guided by way of the positioning aid 3 onto the first ball 5 in such a manner that the center points of the two balls 5, 6 are located precisely on a perpendicular 7 with respect to the first component 1.

As illustrated in FIGS. 5-7, the second ball 6 does not necessarily have to be positioned or welded to the first ball 5 in such a manner that a straight line 7a which extends through the center points of the two balls 5, 6 extends perpendicularly relative to the first component 1. As can be seen in particular in FIGS. 5, 6, 7, the second ball 6 may also be welded to the first ball 5 in an "oblique" manner. In this instance, the straight line 7a which extends through the center points of the two balls 5, 6 extends in an oblique manner relative to a perpendicular of the component 1 and consequently also in an oblique manner relative to the component 1, which is planar in this instance.

The positioning aid 3 which is shown in the Figures is constructed as a "leading" positioning aid, that is to say, it moves into abutment with the first component 1 before the first ball 5 is guided toward the first component 1 or before the second ball 6 is guided toward the first ball 5. In particular when multiple balls are welded, such a positioning aid ensures precise positioning of the balls relative to each other. As already mentioned, the positioning aid 3 further acts as a "local holding-down device" and consequently prevents slipping of the ball which is currently intended to be welded during the welding operation.

As illustrated in FIG. 7, the positioning aid may be constructed in two parts, that is to say, it may be formed by two halves which can be pivoted apart from each other or may have two halves which can be pivoted apart from each other, which facilitates the removal of the positioning aid after the welding operation.

Furthermore, there may be provision for the initiation of the welding operation, that is to say, the switching-on of the sonotrode 4, to be carried out only when a predetermined pressing force acting on the first ball 5 or the second ball 6 is reached or exceeded. Furthermore, there may be provision, in the event that the sonotrode is subsequently pressed or pressed on again, for there to be no re-starting of the welding operation, that is to say, for the sonotrode not to become involved again.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for producing a component connection, the method comprising the acts of:
   providing a first component;
   providing a first ball;
   pressing the first ball against the first component via a sonotrode;
   causing the first ball to vibrate via the sonotrode such that material of the first ball and/or material of the first component melts and welds the first ball to the first component;
   providing a second ball;
   pressing the second ball against the first ball via the same or another sonotrode;
   causing the second ball to vibrate via the same or the other sonotrode such that material of the second ball and/or first ball melts and the second ball is welded to the first ball at a welded joint that is disposed externally of the first component.

2. The method according to claim 1, wherein
   a positioning aid, which at least partially engages round the first ball, is placed on the first ball, and
   the sonotrode is guided and positioned using the positioning aid when the second ball is pressed onto the first ball.

3. The method according to claim 1, wherein
   before the first ball is pressed onto the first component, a positioning aid is first placed on the first component, and
   the sonotrode is guided and positioned when the first ball is pressed onto the first component using the positioning aid.

4. The method according to claim 1, further comprising the act of:
   providing a physical marking in a surface of the first component into which the first ball protrudes, the first ball being clearly positioned relative to the first component via the physical marking.

5. The method according to claim 4, wherein the physical marking is an indentation-shaped recess.

6. The method according to claim 1, wherein the first ball and/or the second ball:
is a solid ball of thermoplastic plastics material,
is a hollow ball of thermoplastic plastics material, or
has a ball core which is coated with a thermoplastic plastics material, wherein the material of the ball core differs from the material of the thermoplastic plastics material.

7. The method according to claim 1, wherein at least one layer of the first ball and/or the second ball, which layer is close to a surface, is reinforced by fibers and/or particles.

8. The method according to claim 1, wherein
the sonotrode has a hollow ball joint receiving member, and
the first ball or the second ball protrudes into the hollow ball-joint receiving member during pressing.

9. The method according to claim 1, wherein the first or second ball is caused to vibrate in a translational manner by the sonotrode.

10. The method according to claim 9, wherein the first or second ball is caused to vibrate in a torsional manner by the sonotrode.

11. The method according to claim 1, wherein the first or second ball is caused to vibrate in a torsional manner by the sonotrode.

12. The method according to claim 1, wherein
the first component, at a location at which the first ball is pressed against the first component, is substantially or precisely planar so that, before welding between the first ball and the location at which the first ball is pressed against the first component, there is a point contact.

13. The method according to claim 1, wherein
the first or second ball is sucked or drawn onto or into the indentation-shaped recess by a suction device, and
in the drawn-in or sucked-in state, the first or second ball is pressed by the sonotrode onto the first component or onto the first ball, respectively.

14. The method according to claim 13, wherein the first or second ball is removed via suction from a ball reservoir.

15. The method according to claim 14, wherein the ball reservoir is a storage container filled with a large number of balls.

16. The method according to claim 1, further comprising the act of clip-fitting a clip element to the first and/or the second ball.

17. The method according to claim 1, further comprising the acts of:
guiding a second component having a through-hole toward the first component such that the first and/or the second ball protrudes into the through-hole or through the through-hole; and
subsequently clipping a clip element to the first and/or the second ball, wherein the first and second components are held together via the clip element.

* * * * *